Figure 1:
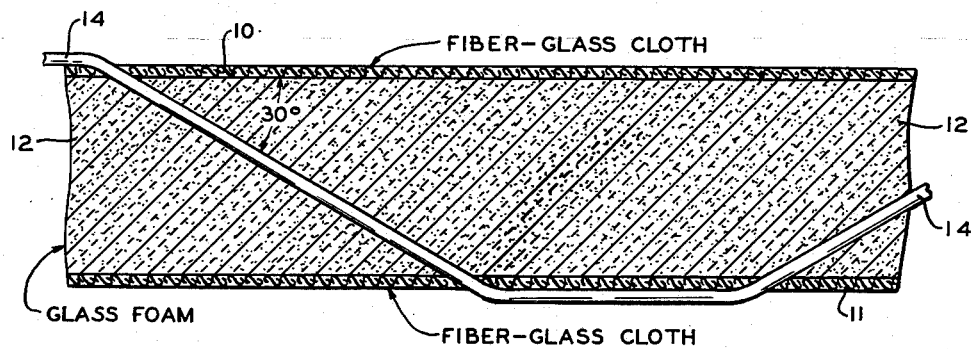

June 9, 1953 — E. A. BLACK — 2,641,561

SANDWICH-TYPE RADOME PANEL

Filed Sept. 8, 1949

INVENTOR.
ERIC A. BLACK
BY
*Harry M. Saragovitz*
ATTORNEY

UNITED STATES PATENT OFFICE 2,641,561

SANDWICH-TYPE RADOME PANEL

Eric A. Black, Red Bank, N. J.

Application September 8, 1949, Serial No. 114,631

1 Claim. (Cl. 154—45.9)

(Granted under Title 35, U. S. Code (1952), sec. 266)

The invention described herein may be manufactured and used by or for the Government for governmental purposes, without the payment of any royalty thereon.

My invention relates to improvements in sandwich-type radome panels.

Numerous types of low-density materials have been especially developed, in an effort to meet the rather exacting requirements for radomes installed in airplanes. The importance of obtaining for radomes, a material which satisfies the exacting requirements therefor becomes apparent when the necessary structural and operating characteristics of airborne radar sets are kept in mind. A radar set can measure range very precisely, but in order to measure direction accurately or in other words, to get better bearing discrimination, it is necessary among other things, to use a very narrow radio beam. This means going into the region called "microwaves," and the use, accordingly, of an antenna whose size is as large as possible. Another advantage of concentrating the beam, is to put more of the energy in the required direction, and so get greater sensitivity.

In general, airborne radar sets present difficult design problems on account of the limitations on size and weight, and also because of the great range of operating conditions which are encountered. Accordingly, it is important to take into account radar-installation problems along with the associated airplane design. One of the problems in such design is to devise for the radar set, a housing or radome which is satisfactory electrically, and which at the same time, meets mechanical requirements. In many installations trouble arose which was traced to the effect of the antenna housing on the performance of the antenna. In the nose-type radomes, such as were used in the P-61 installations, the energy reflected by the radome wall comes back to the antenna. Even though the amount of energy thus reflected may be relatively small, it may have a serious consequence in causing a partial or complete blanking out of certain sectors of the viewing screen. In addition, discontinuities, such as ribs and large reflections from the radome walls, and also from the metal surface of the airplanes, may cause a serious distortion of the radiation pattern of the antenna. The practical result of this may be to cause a marked variation of brightness of a target as the relative position between the target and the radar set changes. In other cases a target might appear to be in a certain direction while actually being in a different direction. In the case of large, streamlined radomes, problems arise in obtaining adequate strength with the desired electrical characteristics, while at the same time maintaining a lightweight structure. Another problem resides in design of the radome wall so that reflection of the microwaves is a minimum over the range of angles of incidence, in order to obtain maximum range and to decrease pattern-distortion trouble due to large random reflection. The ribs previously used in some radomes to give adequate strength, cannot be allowed in the electrical area owing to pattern distortion which might result.

All of the above is contingent, in the first place, upon the design of the panels making up a popular type of radome which is now more or less conventional. If the designer is restricted to only a small amount of reflection from these panels, he can use only a very thin wall of material of a high dielectric factor. If a material of a lower dielectric constant is employed, a much thicker radome wall is permissible. The molded plywood radomes originally used were unsatisfactory. They were made from plywood impregnated and bonded with phenolic resin. Although satisfactory from the point of view of weathering, the conjunction of high dielectric constant with the relatively thick wall needed for mechanical reasons gave too high a reflection. A non-impregnated plywood with a light phenolic glue line had a lower dielectric constant when dry. However, the high water-absorption of this material resulted in a serious increase of dielectric constant on exposure to rain.

At one time during the development of radome structures, a problem arose where the wall thickness based on mechanical considerations was such as to give much too great a reflection. This problem was solved by placing a "dummy" wall inside the outside skin of the radome, and separated from it by a closely controlled distance. By using this double-wall construction, the reflections from the two walls can be made to cancel each other, and thus no power is reflected back to the antenna. Double-wall construction, however, possesses many disadvantages, one of which is the large number of spacers required to hold the correct spacing between the skins, with the possibility of serious pattern distortion.

With all the foregoing in mind, the object of my invention is to provide an improved sandwich-type radome panel which more nearly complies with all the requirements than do the various constructions proposed heretofore. Specifically, these requirements include low dielectric constant, low moisture-absorption, good heat and cold resistance, optimum balance between mechanical and electrical properties, high impact strength and stiffness, small amount of reflection of the microwaves, and elimination of or at least substantial decrease in phase-change of the wave front.

Figure 2:
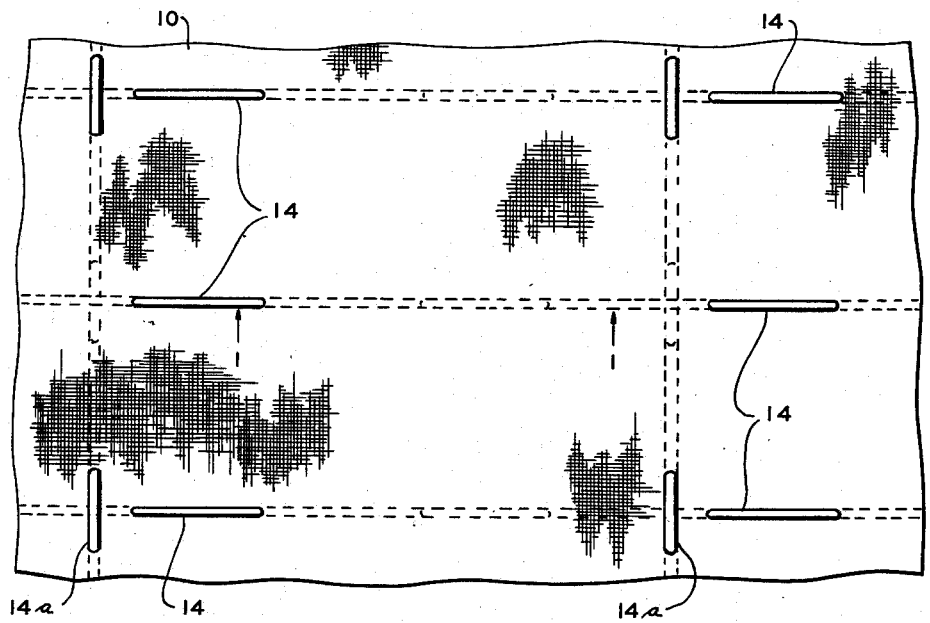

For the purpose of illustrating my invention, an embodiment thereof is shown in the drawing, wherein Fig. 1 is an enlarged, fragmentary, sectional view, the section being taken on the line 1—1 in Fig. 2; and Fig. 2 is a fragmentary, plan view of a panel constructed and having the electrical and mechanical characteristics in accordance with my invention.

My improved radome panel comprises outer "skins" or sheets 10 and 11 of fiber-glass cloth, interposed between is glass foam 12. For the purpose of reenforcement, the three-ply assembly is interlaced with cords 14 of glass fiber. As shown in the drawing, each of the cords 14 is passed through the panel at a suitable angle shown as thirty degrees in Fig. 1 to the respective surfaces thereof, is then run along these surfaces a short distance, which may be about a quarter of an inch, and is then passed again through the panel at an angle to the surfaces. This interlacing process is continued so that each cord weaves back and forth through the panel. Each cord, therefore, is made stiff and secured at all points along its length to the adjacent glass material, thereby giving additional strength and rigidity. As shown more clearly in Fig. 1, the reenforcing cords 14 form truss-like units or lattice girders which are disposed uniformly throughout the panel, as shown in Fig. 2. The relatively high section modulus or impact strength characteristic of my improved construction, is attributable to these truss-like units. Considering just one of these units, it will be seen that the portions of the fiber-glass cloth which constitute the chord members thereof, are under stress when load is applied, the respective parts of the associated cord 14 acting as the web members of the truss or girder. Since the component parts 10, 11, 12 and 14 are made of the same material, there is no difference of coefficient of expansion between adjacent parts to cause separation of the plies or laminations with temperature variations, as in some of the various panel constructions proposed heretofore.

In constructing my improved panel, the filler or core 12 of glass foam may be molded to the desired dimensions. The two sheets or plies 10 and 11 of fiber-glass cloth are cemented respectively to opposite sides of the glass-foam core or filler. Multiple drills may then be used to drill the holes for the fiber-glass cords or strands 14, these holes being made of a diameter slightly larger than that of the latter. The cords 14 are then threaded through the holes. During this step, the cementing material is forced or injected into the holes, whereupon the cords become impregnated, and after hardening of this material they become stiff. The cementing material, furthermore, binds the cords to the glass-foam filler or core 12. The cords 14 will also be cemented to the fiber-glass cloth where contact is made therewith, thus forming a shear connection at these points. The particular angle at which the cords 14 are disposed to the plies or laminations 10 and 11, and the spacing of the cords from each other, are chosen to be most effective for the stresses and electrical conditions involved.

The truss formation or latticework, formed by the cords 14, may be made to slant in the direction of the anticipated stress. Also, additional cords 14a may be employed, and disposed to cross the cords 14 for the purpose of providing reenforcement for loads applied in different directions. The center lamination or filler 12 can be made very light, since it is not depended upon to take or transmit any stresses such as transverse and longitudinal shear.

My improved construction, furthermore, is not only satisfactory as far as aerodynamic loads are concerned, but it is not susceptible to aromatic aviation fuels. Radomes constructed of my improved panels have relatively high heat and cold resistance, and those of the nose type particularly, are not susceptible to thermal collapse when exposed to the sun. Also my novel construction reduces absorption of radar waves, to thereby effect a substantial increase in in-flight radar efficiency. My improved radome panels can be made without difficulty on a mass-production scale, by the low-pressure molding process.

My novel construction has been described as being particularly adaptable for radomes, and especially for nose-type radomes. Any emphasis on this aspect of my disclosure, however, is not to be taken inferentially as a limitation to my claims. Uses other than the one specified can be foreseen. In such cases, any modifications to suit particular requirements or conditions, will become apparent to those skilled in the art without constituting a departure from the spirit of my invention, or the scope of the claim.

I claim as my invention:

In an ultra-high frequency system in which an antenna is mounted on an airplane, a sandwich-type housing for said antenna comprising two sheets of fiber-glass cloth in spaced and substantially parallel relation with respect to each other, glass foam interposed between said sheets, the thickness of said fiber-glass sheets being substantially less than that of said glass foam providing an electromagnetic energy transparent housing, and fiber-glass cords reenforcing said panel, each of said cords passing through said panel at an angle of substantially thirty degrees to the respective surfaces thereof and then running along said surfaces a relatively short distance and again passing through said panel at substantially said angle in interlaced fashion, each of said cords being secured at substantially all points along its length to the adjacent glass material, said angle being such that said cords offer a minimum of interference to the passage of electromagnetic energy through said sheets and glass foam.

ERIC A. BLACK.

References Cited in the file of this patent

UNITED STATES PATENTS

| Number | Name | Date |
|---|---|---|
| 1,942,733 | Shaver | Jan. 9, 1934 |
| 1,961,824 | Goldberg | June 5, 1934 |
| 2,114,546 | Slayter | Apr. 19, 1938 |
| 2,137,756 | Gould et al. | Nov. 22, 1938 |
| 2,414,125 | Rheinfrank | Jan. 14, 1947 |